United States Patent

Davis

[11] 3,906,708
[45] Sept. 23, 1975

[54] METHOD AND APPARATUS FOR BREAKING AND TRAINING ANIMALS

[76] Inventor: John Buckley Davis, Old Frankfurt Pk., Rt. No. 8, Lexington, Ky. 40504

[22] Filed: Feb. 14, 1974

[21] Appl. No.: 442,555

[52] U.S. Cl. .................................. 54/71; 119/29
[51] Int. Cl. ............................................ B68b 1/00
[58] Field of Search .......... 54/71, 77, 24, 6; 119/29, 119/130, 106, 109, 96

[56] References Cited
UNITED STATES PATENTS

| | | | |
|---|---|---|---|
| 381,332 | 4/1888 | Carmichael | 119/96 |
| 710,267 | 9/1902 | Graf | 54/71 |
| 914,257 | 3/1909 | Farrow | 119/128 |
| 2,275,983 | 3/1942 | Nadeau | 119/109 X |
| 2,861,547 | 11/1958 | Dale | 119/109 |
| 2,994,300 | 8/1961 | Grahling | 119/109 |
| 3,072,097 | 1/1963 | Morchand | 119/109 X |
| 3,104,650 | 9/1963 | Grahling | 119/109 X |
| 3,116,948 | 1/1964 | Elsner | 119/109 X |

*Primary Examiner*—Louis G. Mancene
*Assistant Examiner*—J. Q. Lever
*Attorney, Agent, or Firm*—Sughrue, Rothwell, Mion, Zinn & Macpeak

[57] ABSTRACT

A pair of animals, preferably of similar genus and size, are tethered close together by means of a neck strap on one animal and a bridle on the other animal with a short length flexible coupling therebetween such that the animal coupled by means of the neck strap leads the animal coupled by means of the bridle. The harness and bridle connections are reversed with respect to the animals to reverse the lead, and then both animals are linked closely by a short length flexible coupling member connected to bridles on respective animals. The flexible coupling member preferably comprises a pair of pull-to-open snap shackles coupled to a short length of metal chain by swivel connections for the shackles.

5 Claims, 5 Drawing Figures

US Patent  Sept. 23,1975  3,906,708
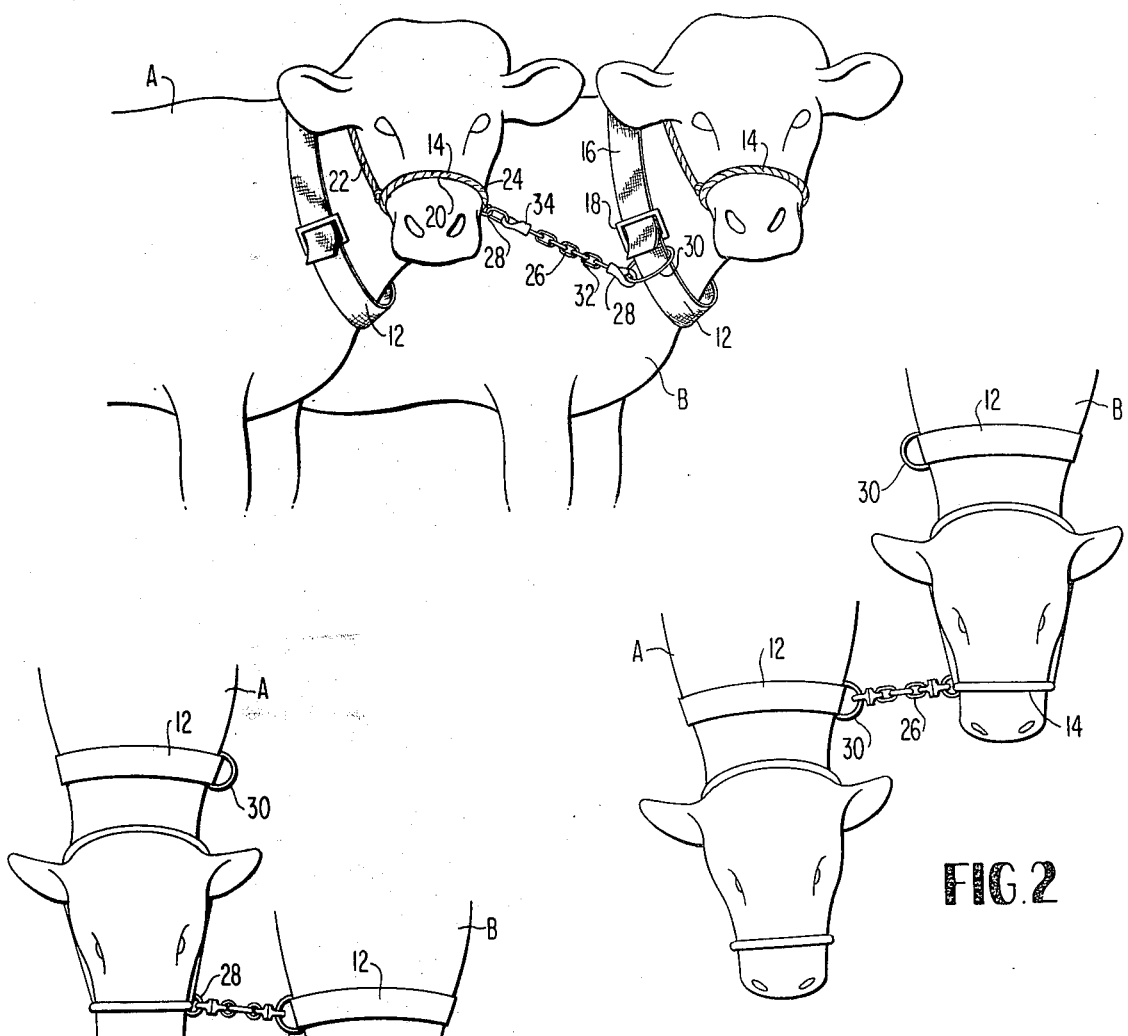
FIG.1
FIG.2
FIG.3
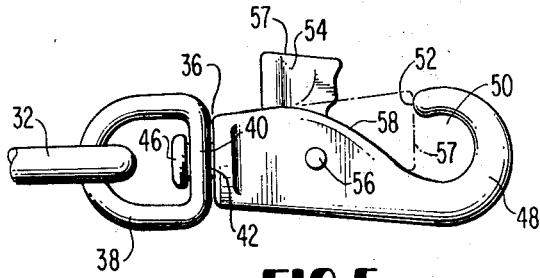
FIG.5
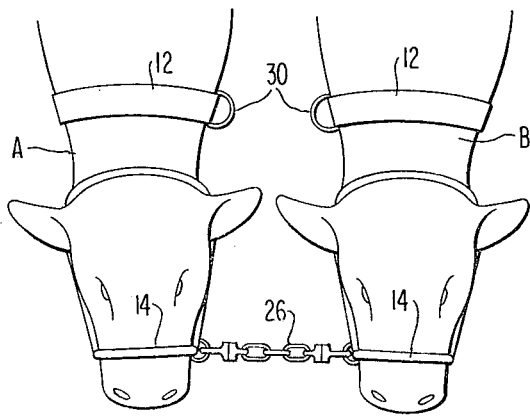
FIG.4

METHOD AND APPARATUS FOR BREAKING AND TRAINING ANIMALS

BACKGROUND OF THE INVENTION

1. Field of the Invention

This invention relates to a method and apparatus for breaking two animals, and more particularly, to an arrangement for effecting self-breaking of both animals by forcing one animal to pull the other and then reversing that arrangement to effectively achieve "a buddy break" of both animals.

2. Description of the Prior Art

Breed stock such as cattle command relatively high prices and are normally sold at cattle auctions, wherein it is necessary for the animal to be led into an exhibition area, where the calf must stand in proper fashion during a visual showing to the prospective purchaser prior to or during the auction. The calf must be trained to the extent where the animal submits to being led and will stand for a given length of time. The ability of the calf to properly follow the attendant may materially affect its sales price, Further, it is a necessity, of course, to break the animal sufficiently that it will follow commands and will move by being lightly pulled. Normally, the calf is led by being lightly pulled by means of a rope attached to the animal by means of a bridle which envelopes the head and face of the calf. Conventionally, trainers have been employed for breaking the animals and training them to be led from place to place. With the cost of labor continually increasing and because such labor is of a menial nature, it is difficult and expensive to obtain the services of such trainers.

SUMMARY OF THE INVENTION

The present invention has the object of avoiding expense and the necessity of employing a trainer in breaking and training animals such as breed calves and the like.

The present invention is directed both to the method and apparatus for self breaking of two animals, preferably of similar genus and size. The method of the present invention comprises, in sequence, the steps of tethering both animals close together by means of a neck strap on one animal and a bridle on the other animal such that the one animal pulls the other through the neck strap, due to the ability of that animal to physically overpower and pull the other animal coupled at its bridle. The leverage and available force from the animal having the bridle connection is much less than that of the animal connected at the neck strap. Reversing the neck strap and bridle connections of the animals allows the other animal to then lead the one animal. Subsequently, both animals are linked close together by means of their bridles.

In terms of the apparatus for achieving the breaking and training of such animals, which includes neck straps and bridles for both animals and a short length of flexible coupling member which may be selectively coupled at its ends to either the bridle or neck straps of respective animals, the improvement resides in the coupling member comprising a pair of snap shackles, a chain of at least one link, and swivel connection between the snap shackles and the chain. Preferably, the snap shackles are the "pull-to-open" type wherein the snap shackle has a base and an open hook portion extending therefrom and turned back towards the base but spaced therefrom to form a fixed abutment defining a gap therebetween and a closure is pivotably mounted within the base and spring biased towards the hook portion abutment to close the gap such that the shackle is connected to the harness or bridle of a respective animal by pulling the closure outwardly against the bias and away from the abutment to open the gap.

BRIEF DESCRIPTION OF THE DRAWINGS

FIG. 1 is a front and side perspective view of two calves of similar size incorporating the apparatus of the present invention for breaking and training the animals wherein the right hand calf is pulling the left hand calf.

FIG. 2 is a top plan view of the calves of FIG. 1, with the bridle and harness connections reversed such that the left hand calf pulls the right hand calf.

FIG. 3 is a top plan view of the calves of FIG. 1 with the breaking and training connection identical to that figure.

FIG. 4 is a top plan view of the two calves of FIG. 1 with the calves linked together at their bridles in the final step of "buddy" breaking.

FIG. 5 is an elevational view of a portion of the flexible coupling employed in FIGS. 1–4, illustrating the swivel connected pull-to-open snap shackle forming an important aspect of the apparatus of the present invention.

DESCRIPTION OF THE PREFERRED EMBODIMENT

While the present invention has application to the breaking and training of many types of domestic animals, preferably of the same size and genus, the method and apparatus of the present invention is illustrated in the drawing as having application to the breaking of a pair of breek stock calves, and in which case, the paired calves are identified as left and right hand calves A and B in FIGS. 1–4. Each of the calves is provided with a neck strap 12 and a bridle 14, these items being of conventional manufacture. Thus, items 12 and 14 themselves form no part of the present invention, except as a part of a combination apparatus and as employable within the method steps of the present invention. In this respect, the neck straps 12 comprise a single loop belt 16 formed of a conventional web material terminating in buckle 18 permitting neck strap to be placed around the neck of each animal with a degree of tightness required but without providing discomfort to the animals.

With respect to the bridle 14, the bridle consists primarily of rope 20, having knotted interconnections to form a loop portion 22 passing over the head of each animal and a second loop portion 24 which extends about the face of the animal and interconnection of loops 22 and 24 may be achieved by means of a chain or the like (not shown) which may be received within the mouth of the animals such as calves A and B. It is only necessary with respect to the bridles 14 that they be provided with means for attachment of an interconnecting flexible coupling member 26. In this respect, the bridles are therefore preferably provided with metal rings such as rings 20 on each side thereof, permitting the flexible coupling member 26 to be connected thereto at its ends. Further, the neck strap 12 carries at a fixed location a ring 30 permitting the ends of the flexible coupling member 26 to be detachably coupled thereto. Preferably, the flexible coupling member 26 comprises a metal chain 32 consisting of one or more links and terminating at each end in a pull-toopen snap shackle 34. Snap shackle 34 may be best seen in FIG. 5. The snap shackles 34 are coupled to the respective ends of chain 32 by means of swivel connections indicated generally at 36. In this respect, each snap shackle 34 consists of a modified ring 38 flattened at one side as at 40 and provided with an aperture which receives pivot pin 42 which is integral with base 44 of the snap shackle 34. The head of the pivot pin 42 which protrudes through the aperture is flattened as at 40 to provide the swivel connection. Each snap shackle 34 terminates at the end remote from the swivel connection 36 in a hook portion 48 which turns back on itself defining an opening 50 and forming an abutment 52 at its terminal end. A closure 54 is pivotally mounted by means of pin 56 within a slot (not shown) within base 44 for pivoting about the axis of pin 56 which is coaxial with opening 50. The closure 54 has a flat end face 57 which is spring biased towards closed position and contact with abutment 52, thus completely closing off access to opening 50 by filling the gap between abutment 52 and the curved face 58 of base 44. Opening 50 is of a size sufficient to receive either ring 30 on the neck strap 12 or ring 28 of bridle 14 of a given animal.

With the swiveled, "pull-to-open" snap shackle at each end of chain 32 forming the flexible connecting member 26, connection may be made between the animals at either neck strap 12 or bridle 14 in easy but positive manner, preventing separation of the animals regardless of whether the animals are neck strap to bridle connected or bridle to bridle connected.

The method of self breaking and training of the animals by the buddy break arrangement of the present invention may be appreciated from the sequence of connection and training steps achieved by reference to FIGS. 1 and 3 as a first step, reference to FIG. 2 as a second step, and reference to FIG. 4 as a third step. In this regard, FIG. 1 shows calf A being tethered to calf B by the employment of the flexible connecting member 26 whose left hand snap shackle 34 is coupled via ring 28 to bridle 14 of calf A, while right hand snap shackle 28, at the opposite end of the chain 32, is snapped to ring 30 of the neck strap 12 of animal B. Under such an arrangement, calf B may readily overcome any attempt of calf A to be pulled, because of the force that can be exerted due to its connection via the chain through neck strap 12 is quite high in contrast to the force exerted by calf A through its bridle 14. The lack of available force and discomfort of calf A is obvious from the connection shown in FIGS. 1 and 2.

After operating this connection for a period of time, such as a day, the connections are reversed as seen in FIG. 2, wherein calf A is coupled by flexible coupling member 26 to calf B by means of the harness 12 on calf A and the bridle 14 on calf B. Calf A now pulls calf B for the second period of time. After a given period of time, which may include additional reversals in bridle to neck strap connection, that is, from the arrangement of FIG. 2 back to the arrangement of FIG. 1, and vice versa, the calves are sufficiently broken that both calves may be interconnected at their bridles. Any excessive pulling force acts as an irritant to the calves, the calves quickly learn to walk together for mutual convenience and minimization of irritation and discomfort. The coupling member 26 is relatively short and maintains the calves A and B quite close to each other maximizing the effect of one calf pulling or leading the other.

While straps 12 have been referred to as neck straps, it is readily apparent that these straps may have substituted therefor, shoulder straps which may include a portion encircling the animal forward or to the rear of the front legs of the animal, it only being important that the lead animal be provided with strap or harness means for exerting a superior pulling force on the other animal to which it is coupled thereto by means of a bridle.

While the training method and apparatus has been shown as applied to young calves, particularly of breed stock, the present invention has by no way limited such application and generally may be applied to the training of all types of domestic animals, particularly where they must be subsequently led and required to stand for display or exhibition or sale purposes.

While the invention has been particularly shown and described with reference to a preferred embodiment thereof, it will be understood by those skilled in the art that various changes in form and details may be made therein without departing from the spirit and scope of the invention.

What is claimed is:

1. A method of breaking two unbroken animals of generally similar genus and size, said method comprising in sequence, the steps of:
   a. tethering both animals close together by means of a neck strap on one animal and a bridle on the other such that said one animal leads the other,
   b. reversing the harness and bridle connections of said animals such that said other animal then leads said one animal, and
   c. linking both animals closely together by means of bridles on both animals.

2. In an apparatus for breaking and training unbroken animals of generally similar genus and size, including at least one neck strap and one bridle on respective animals and interchangeable between said animals and a short length flexible coupling member having ends respectively coupled to said bridle and harness, the improvement wherein: said coupling member comprises a pair of snap shackles, a chain comprising at least one link and swivel connections between each snap shackle and respective ends of said chain.

3. The apparatus as claimed in claim 2, wherein said snap shackles are of the pull-to-open type.

4. The apparatus as claimed in claim 3, wherein each snap shackle comprises:
   a base,
   a hook portion extending from said base and having its terminal end turned back towards said base but spaced therefrom to form a fixed abutment defining with said base a gap,
   and a closure pivotably mounted within said base and biased towards said hook portion abutment to normally close said gap, whereby said shackles are connected to neck straps or bridles so as to resist uncoupling by any pulling effect exerted on the coupling member by respective animals.

5. The apparatus as claimed in claim 4, wherein the face of said closure member contacting said abutment lies generally at right angles to a line extending between abutment and said closure pivot axis such that forces exerted on said face of said closure tend to maintain said closure in contact with said abutment.

* * * * *